(12) United States Patent
Cheng

(10) Patent No.: US 9,116,534 B2
(45) Date of Patent: Aug. 25, 2015

(54) DC-DC CONTROLLER HAVING TRANSIENT RESPONSE ENHANCEMENT

(71) Applicant: uPI Semiconductor Corp., Hsinchu County (TW)

(72) Inventor: Hung-Hsuan Cheng, Hsinchu County (TW)

(73) Assignee: uPI Semiconductor Corp., Hsinchu County (TW)

( * ) Notice: Subject to any disclaimer, the term of this patent is extended or adjusted under 35 U.S.C. 154(b) by 126 days.

(21) Appl. No.: 13/787,833

(22) Filed: Mar. 7, 2013

(65) Prior Publication Data

US 2014/0077779 A1    Mar. 20, 2014

(30) Foreign Application Priority Data

Sep. 18, 2012    (TW) .............................. 101134169 A

(51) Int. Cl.
  *G05F 1/00*    (2006.01)
  *G05F 1/46*    (2006.01)
  *H02M 3/156*   (2006.01)

(52) U.S. Cl.
  CPC .................. *G05F 1/46* (2013.01); *H02M 3/156* (2013.01); *H02M 2003/1566* (2013.01)

(58) Field of Classification Search
  USPC .................................... 323/284–288; 361/111
  See application file for complete search history.

(56) References Cited

U.S. PATENT DOCUMENTS

| 6,229,292 | B1 * | 5/2001 | Redl et al. ...................... 323/285 |
| 7,495,424 | B1 * | 2/2009 | Mei et al. ....................... 323/284 |
| 7,960,947 | B2   | 6/2011 | Chen et al. |
| 2010/0156362 | A1 * | 6/2010 | Xie ................................ 323/273 |
| 2010/0181977 | A1 * | 7/2010 | Sohma ........................... 323/282 |
| 2012/0038332 | A1   | 2/2012 | Lin |

FOREIGN PATENT DOCUMENTS

TW    201012039    3/2010

OTHER PUBLICATIONS

"Office Action of Taiwan Counterpart Application", issued on Jun. 30, 2014, p. 1-p. 6, in which the listed reference was cited.

* cited by examiner

*Primary Examiner* — Adolf Berhane
*Assistant Examiner* — Gary Nash
(74) *Attorney, Agent, or Firm* — Jianq Chyun IP Office

(57) ABSTRACT

A DC-DC controller is provided. The DC-DC controller is connected to an output stage and a load, and the output stage is connected to the load through an output inductor. The DC-DC controller includes an error amplifier, a pulse width modulation (PWM) generation circuit and a compensation circuit. A first input terminal of the error amplifier is connected to one terminal of the output inductor. A second terminal of the error amplifier receives a reference voltage. The PWM generation circuit is connected to the error amplifier and provides a PWM signal to the output stage. The compensation circuit is at least connected to an output terminal of the error amplifier. The compensation circuit includes an adjustable capacitor circuit. The adjustable capacitor circuit adjusts an equivalent capacitance value according to a change of the load dynamically, so as to speed up a reaction rate in the transient response.

8 Claims, 13 Drawing Sheets

DC-DC CONTROLLER HAVING TRANSIENT RESPONSE ENHANCEMENT

CROSS-REFERENCE TO RELATED APPLICATION

This application claims the priority benefit of Taiwan application serial no. 101134169, filed on Sep. 18, 2012. The entirety of the above-mentioned patent application is hereby incorporated by reference herein and made a part of this specification.

BACKGROUND

1. Technical Field

The invention relates to a direct current (DC)-DC controller. Particularly, the invention relates to a DC-DC controller capable of dynamically adjusting an equivalent capacitance value.

2. Related Art

As shown in FIG. 1 and FIG. 2, a conventional direct current (DC)-DC converter 100 or 200 converts an input voltage VIN into an output voltage VOUT, and provides a load current ILOAD. A feedback voltage FB is extracted from the output voltage VOUT. The error amplifier 10 receives the feedback voltage FB and a reference voltage VREF to provide an error signal COMP. Then, the error amplifier 10 outputs the error signal COMP to a pulse width modulation (PWM) generation circuit 20. The PWM generation circuit 20 compares the error signal COMP with a ramp signal RAMP, so as to provide a PWM signal to an output stage 30.

When the load current ILOAD changes, the output voltage VOUT accordingly changes. The feedback voltage FB is processed by the error amplifier 10 to generate the error signal COMP. The error signal COMP and the ramp signal RMAP result in a long on-time period or short on-time period, until an average inductor current on an inductor LOUT is the same to the load current ILOAD, and the output voltage VOUT and the on-time period are recovered to an original level.

The DC-DC converter 100/200 includes a compensation unit 40A/40B. The compensation unit 40A is coupled between output terminal of the error amplifier and a ground terminal, and the compensation unit 40B is coupled between the output terminal and an inverting input terminal of the error amplifier. The compensation unit 40A or 40B includes a resistor R1 and a capacitance amplifying circuit 50. The compensation unit 40A or 40B is used to compensate the error signal COMP. However, an equivalent capacitance value of the capacitance amplifying circuit 50 is fixed, by which compensation of the error signal COMP cannot be speeded up when the load changes, so that a reaction rate in transient response cannot be improved.

SUMMARY

Accordingly, the invention is directed to a direct current (DC)-DC controller, which resolves the problem mentioned in the related art.

The invention provides a DC-DC controller, which is connected to an output stage and a load, and the output stage is connected to the load through an output inductor. The DC-DC controller includes an error amplifier, a pulse width modulation (PWM) generation circuit and a compensation circuit. A first input terminal of the error amplifier is connected to one terminal of the output inductor. A second input terminal of the error amplifier receives a reference voltage. The PWM generation circuit is connected to the error amplifier and provides a PWM signal to the output stage. The compensation circuit is connected to an output terminal of the error amplifier. The compensation circuit includes an adjustable capacitor circuit. The adjustable capacitor circuit dynamically adjusts an equivalent capacitance value according to a change of the load.

In an embodiment of the invention, the adjustable capacitor circuit downgrades the equivalent capacitance value in case of a transient change of the load.

In an embodiment of the invention, the adjustable capacitor circuit includes a capacitance amplifying circuit and a current detecting circuit. The capacitance amplifying circuit provides the equivalent capacitance value. The current detecting circuit is connected to the output terminal of the error amplifier and the capacitance amplifying circuit, and the current detecting circuit dynamically controls the capacitance amplifying circuit according to the change of the load.

In an embodiment of the invention, the capacitance amplifying circuit includes a first amplifier, a first resistor, a second resistor, a first capacitor, a first controllable current source and a second controllable current source. The first resistor is connected to a first input terminal of the first amplifier. A first terminal of the second resistor is connected to the first resistor, and a second terminal thereof is connected to a second input terminal of the first amplifier. The first capacitor is coupled between the first input terminal of the first amplifier and a ground terminal. A first terminal of the first controllable current source is connected to an operating voltage, a control terminal thereof is connected to the current detecting circuit, a second terminal thereof is connected to the second terminal of the second resistor and the second input terminal of the first amplifier, and a third terminal thereof is connected to the first amplifier. A first terminal of the second controllable current source is connected to the second terminal of the first controllable current source, the second terminal of the second resistor and the second input terminal of the first amplifier, a control terminal thereof is connected to the current detecting circuit, and a second terminal thereof is connected to the ground terminal.

In an embodiment of the invention, the adjustable capacitor circuit includes a capacitance amplifying circuit and a voltage detecting circuit. The capacitor amplifying circuit provides the equivalent capacitance value. The voltage detecting circuit is connected to the first input terminal and the second input terminal of the error amplifier and the capacitance amplifying circuit, and the voltage detecting circuit dynamically controls the capacitance amplifying circuit according to the change of the load.

In an embodiment of the invention, the voltage detecting circuit includes a second amplifier, a first input terminal of the second amplifier is connected to the second input terminal of the error amplifier, a second input terminal of the second amplifier is connected to the first input terminal of the error amplifier, and an output terminal of the second amplifier is connected to the capacitance amplifying circuit.

In an embodiment of the invention, the adjustable capacitor circuit includes a capacitance amplifying circuit and a surge detecting circuit. The capacitance amplifying circuit provides the equivalent capacitance value. The surge detecting circuit is connected to the second input terminal or the output terminal of the error amplifier, and the surge detecting circuit dynamically controls the capacitance amplifying circuit according to the change of the load.

In an embodiment of the invention, the surge detecting circuit includes a differentiator.

According to the above descriptions, the DC-DC controller detects a current change of the output terminal of the error amplifier according to a detection mechanism, or detects a change of the feedback voltage input to the error amplifier, or detects a voltage change of the input terminal or the output terminal of the error amplifier, the equivalent capacitance value of the adjustable capacitor circuit can be dynamically adjusted according to the change of the load, so as to speed up a reaction rate in the transient response.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
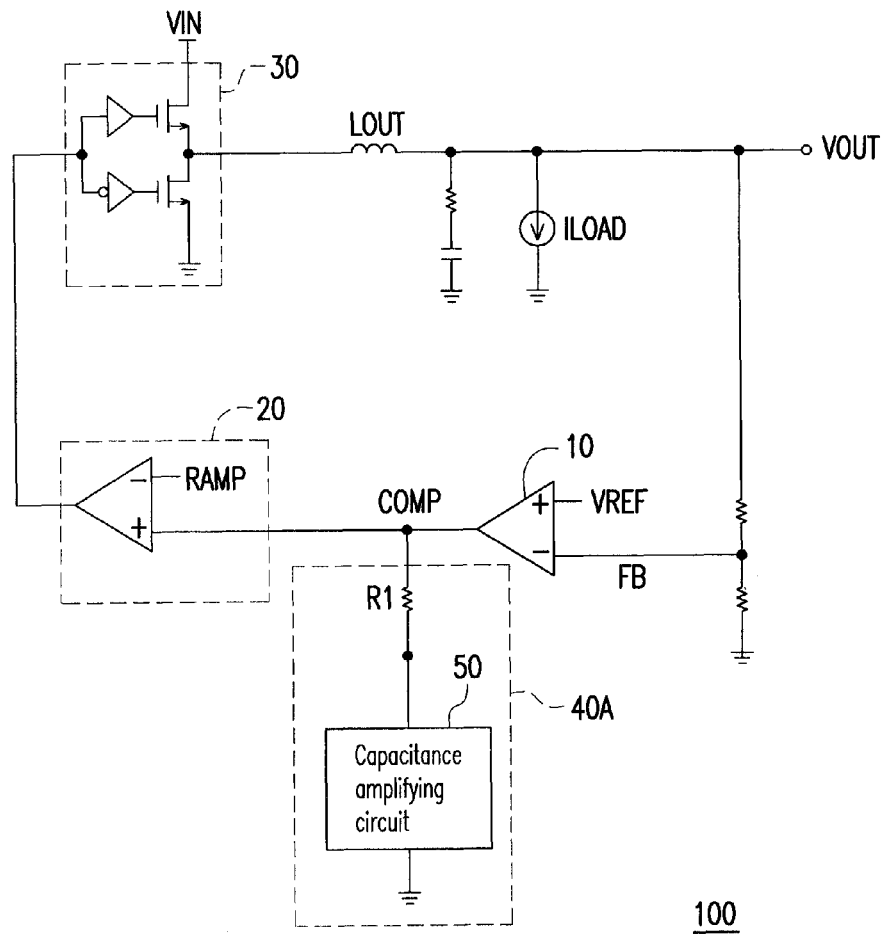
FIG. 1 and FIG. 2 are schematic diagrams of a conventional direct current (DC)-DC converter.
Figure 2:
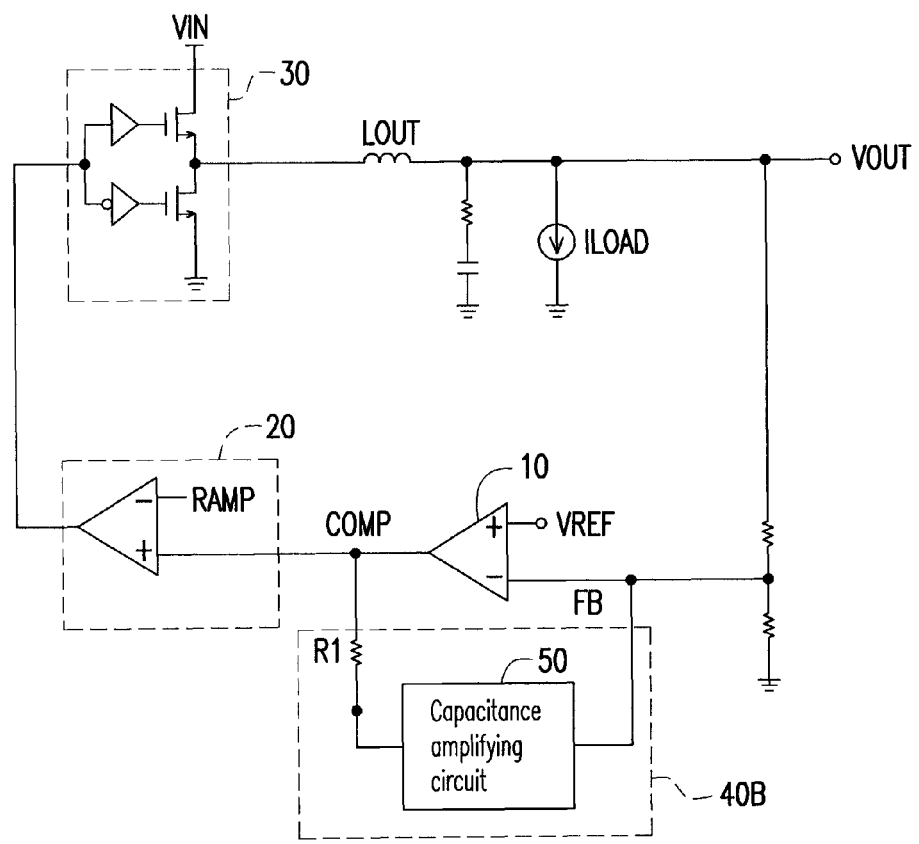

Reference will now be made in detail to the present preferred embodiments of the invention, examples of which are illustrated in the accompanying drawings. Wherever possible, the same reference numbers are used in the drawings and the description to refer to the same or like parts.

Figure 3:
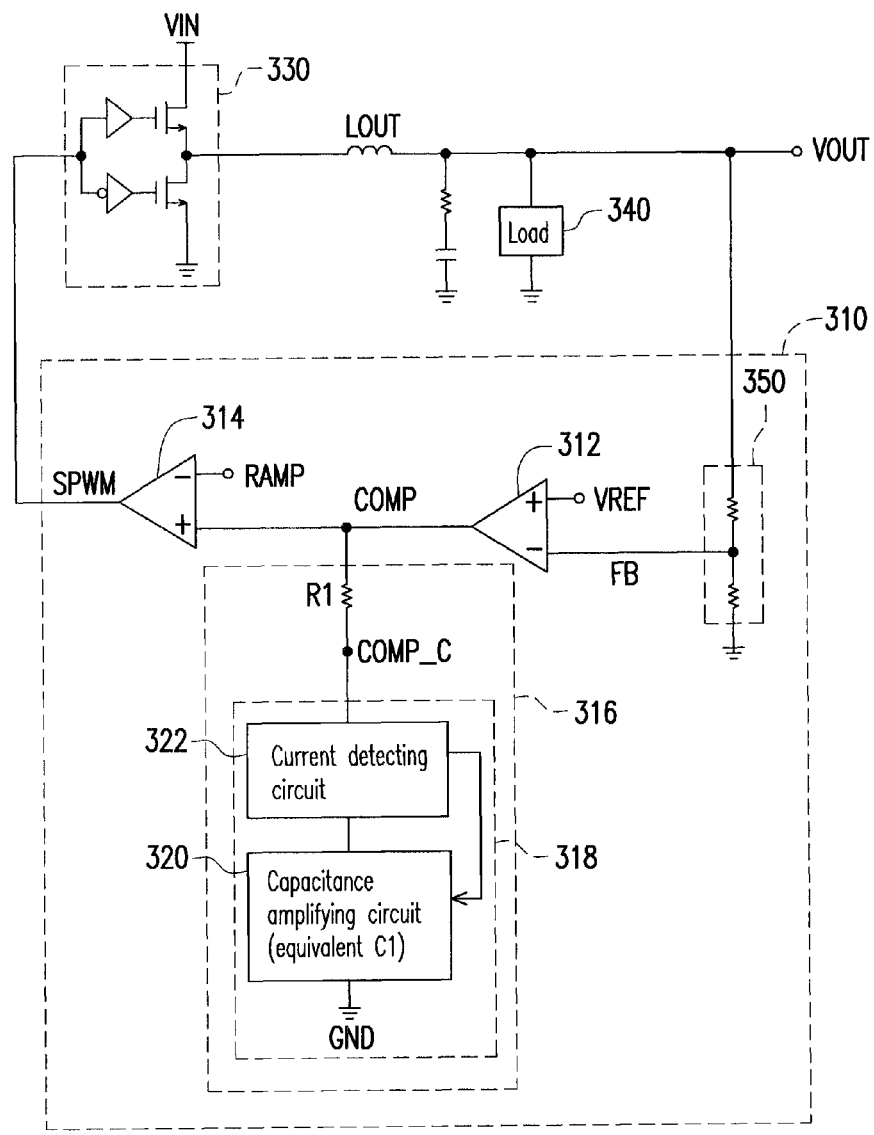
FIG. 3 is a schematic diagram of a DC-DC converter according to an embodiment of the invention.

FIG. 3 is a schematic diagram of a direct current (DC)-DC converter according to an embodiment of the invention. Referring to FIG. 3, in the DC-DC converter 300, a DC-DC controller 310 is connected to an output stage 330 and a load 340. The output stage 330 is connected to the load 340 through an output inductor LOUT, and the DC-DC controller 310 includes an error amplifier 312, a pulse width modulation (PWM) generation circuit 314 and a compensation circuit 316. The DC-DC converter 300 is used to convert an input voltage VIN into an output voltage VOUT.

A voltage dividing circuit 350 provides a feedback voltage FB, and the feedback voltage FB is proportional to the output voltage VOUT. An inverting input terminal of the error amplifier 312 receives the feedback voltage FB, and is connected to one terminal of the output inductor LOUT through the voltage dividing circuit 350. A non-inverting input terminal of the error amplifier 312 receives a reference voltage VREF. The error amplifier 312 generates an error signal COMP based on the feedback voltage FB and the reference voltage VREF. The PWM generation circuit 314 compares the error signal COMP and a ramp signal RAMP, and provides a PWM signal SPWM to the output stage 330.

The compensation circuit 316 is connected to an output terminal of the error amplifier 312. In the embodiment of FIG. 3, the compensation circuit 316 is coupled between the output terminal of the error amplifier 312 and the PWM generation circuit 314. The compensation circuit 316 includes a resistor R1 and an adjustable capacitor circuit 318. The adjustable capacitor circuit 318 includes a capacitance amplifying circuit 320 and a current detecting circuit 322. The capacitance amplifying circuit 320 provides an adjustable equivalent capacitance value (C1). The current detecting circuit 322 is connected to the output terminal of the error amplifier 312 and the capacitance amplifying circuit 320. When the load 340 changes, the output voltage VOUT accordingly changes. A magnitude of the feedback voltage FB relates to the output voltage VOUT. The error amplifier 312 generates the error signal COMP according to the feedback voltage FB. Therefore, the error signal COMP accordingly changes. The current detecting circuit 322 controls the capacitance amplifying circuit 320 according to a change of the error signal COMP.

Figure 4:
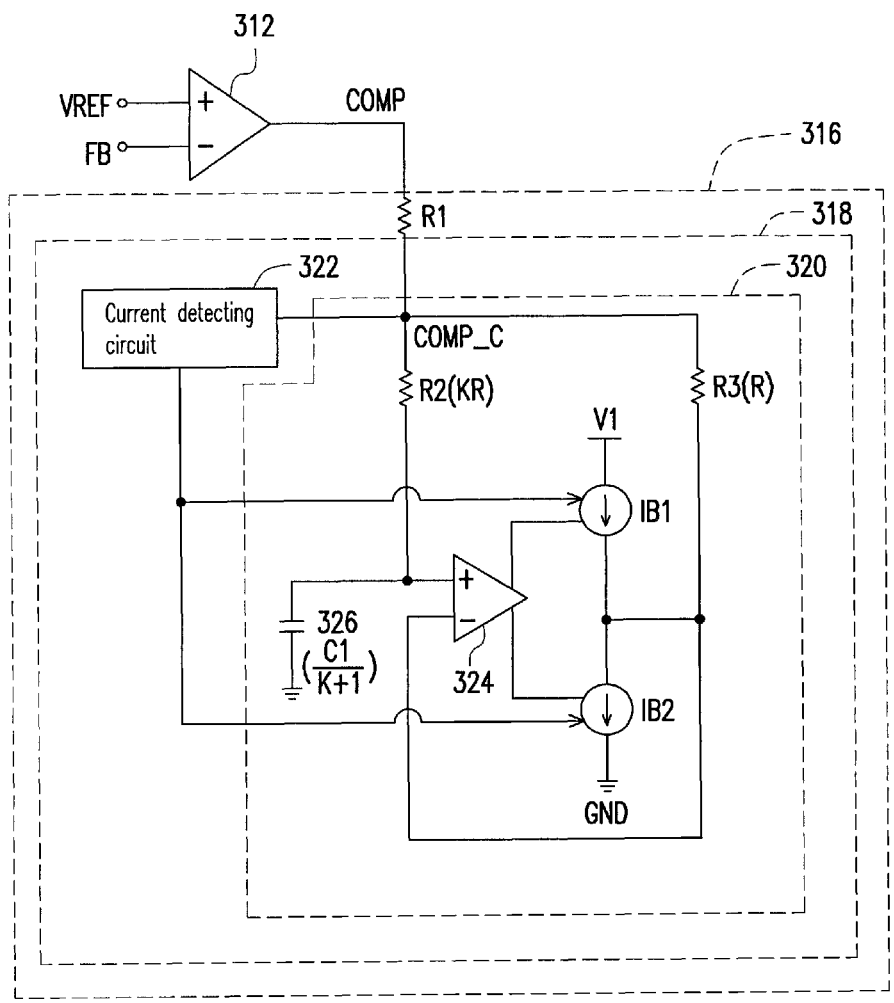
FIG. 4 is a detailed circuit diagram of an adjustable capacitor circuit of FIG. 3.

FIG. 4 is a detailed circuit diagram of the adjustable capacitor circuit 318 of FIG. 3. The adjustable capacitor circuit 318 includes the capacitance amplifying circuit 320 and the current detecting circuit 322. The capacitance amplifying circuit 320 includes an amplifier 324, a resistor R2, a resistor R3, a capacitor 326, a controllable current source IB1 and a controllable current source IB2. The resistor R2 is coupled between the resistor R1 and a non-inverting input terminal of the amplifier 324. A first terminal of the resistor R3 is connected to the resistors R1 and R2, and a second terminal thereof is connected to an inverting input terminal of the amplifier 324. The capacitor 326 is coupled between the non-inverting input terminal of the amplifier 324 and a ground terminal GND.

A first terminal of the controllable current source IB1 is connected to an operating voltage V1, a control terminal thereof is connected to the current detecting circuit 322, a second terminal thereof is connected to the second terminal of the resistor R3 and the inverting input terminal of the amplifier 324, and a third terminal thereof is connected to the amplifier 324. A first terminal of the controllable current source IB2 is connected to the second terminal of the controllable current source IB1, the second terminal of the resistor R3 and the inverting input terminal of the amplifier 324, a control terminal thereof is connected to the current detecting circuit 322, and a second terminal thereof is connected to the ground terminal GND.

The current detecting circuit 322 is used to continually detect an output current of the error amplifier 312. When the current exceeds predetermined upper limit or lowers predetermined lower limit, the current detecting circuit 322 activates a control mechanism to control the capacitance amplifying circuit 320. For example, when the current detecting circuit 322 detects that the error signal COMP changes along with the load, it downgrades the current of the controllable current sources IB1 and IB2. In this way, the current flowing through the resistor R3 is decreased, and the equivalent capacitance value of the capacitor 326 is accordingly decreased, by which an output variation of the error amplifier 312 is speeded up, so as to improve the transient response. Therefore, the current detecting circuit 322 can dynamically control the capacitance amplifying circuit 320 according to the change of the error signal COMP.

Moreover, it is assumed that resistance values of the resistors R2 and R3 are respectively K times R and 1 times R, and the equivalent capacitance value of the capacitor 326 is C1/(K+1), a total equivalent capacitance value of a terminal COMP_C of the capacitor amplifying circuit 320 is then equal to C1/(K+1) times (K+1), namely, the total equivalent capacitance value is equal to C1.

Figure 5:
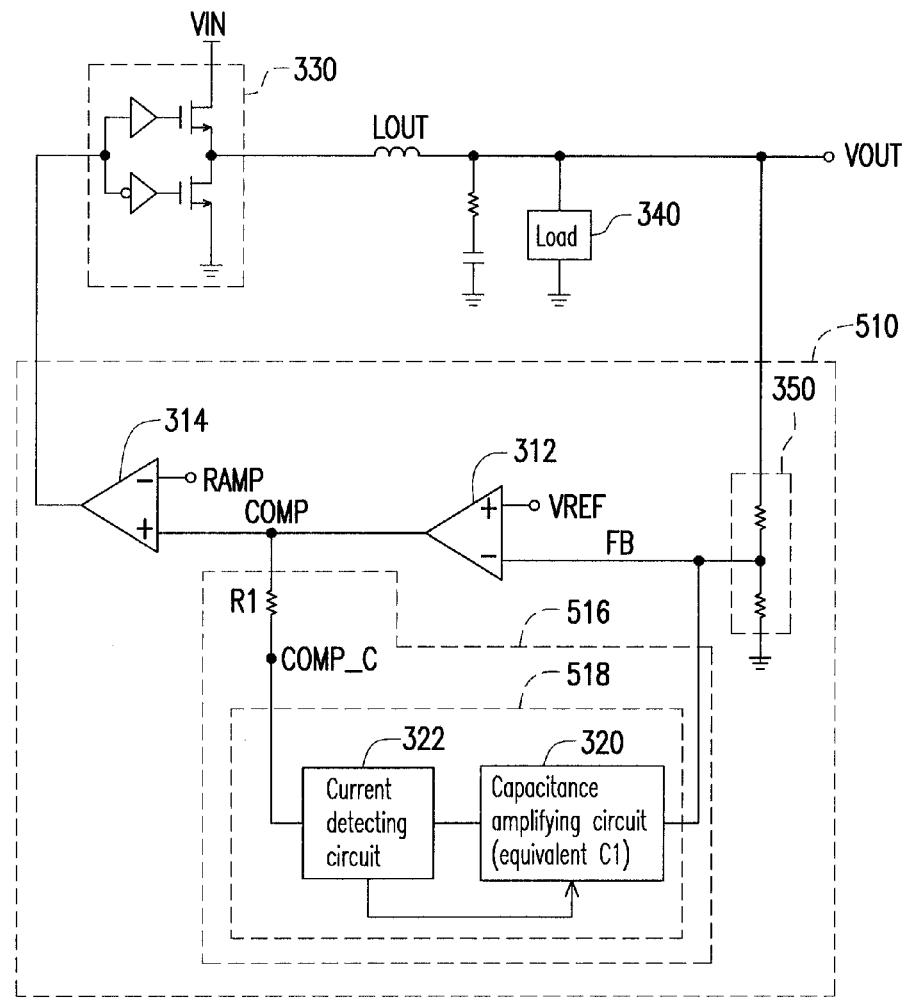
FIG. 5 is a schematic diagram of a DC-DC converter according to another embodiment of the invention.

FIG. 5 is a schematic diagram of a DC-DC converter 500 according to another embodiment of the invention. Referring to FIG. 5, a DC-DC controller 510 is similar to the DC-DC controller 310, and a difference there between is that one terminal of a compensation circuit 516 is coupled between the output terminal of the error amplifier 312 and the PWM generation circuit 314, and another terminal of the compensation circuit 516 is connected to the inverting input terminal of the error amplifier 312. In other words, in FIG. 3, one terminal of the capacitance amplifying circuit 320 is connected to the current detecting circuit 322, and another terminal thereof is connected to the ground terminal GND; while in FIG. 5, one terminal of the capacitance amplifying circuit 320 is connected to the current detecting circuit 322, and another terminal thereof is connected to the inverting input terminal of the error amplifier 312.

A working principle of an adjustable capacitor circuit 518 of FIG. 5 is similar to that of the adjustable capacitor circuit 318 of FIG. 4, so that details thereof can refer to the embodiment of FIG. 4, which are not repeated.

Figure 6:
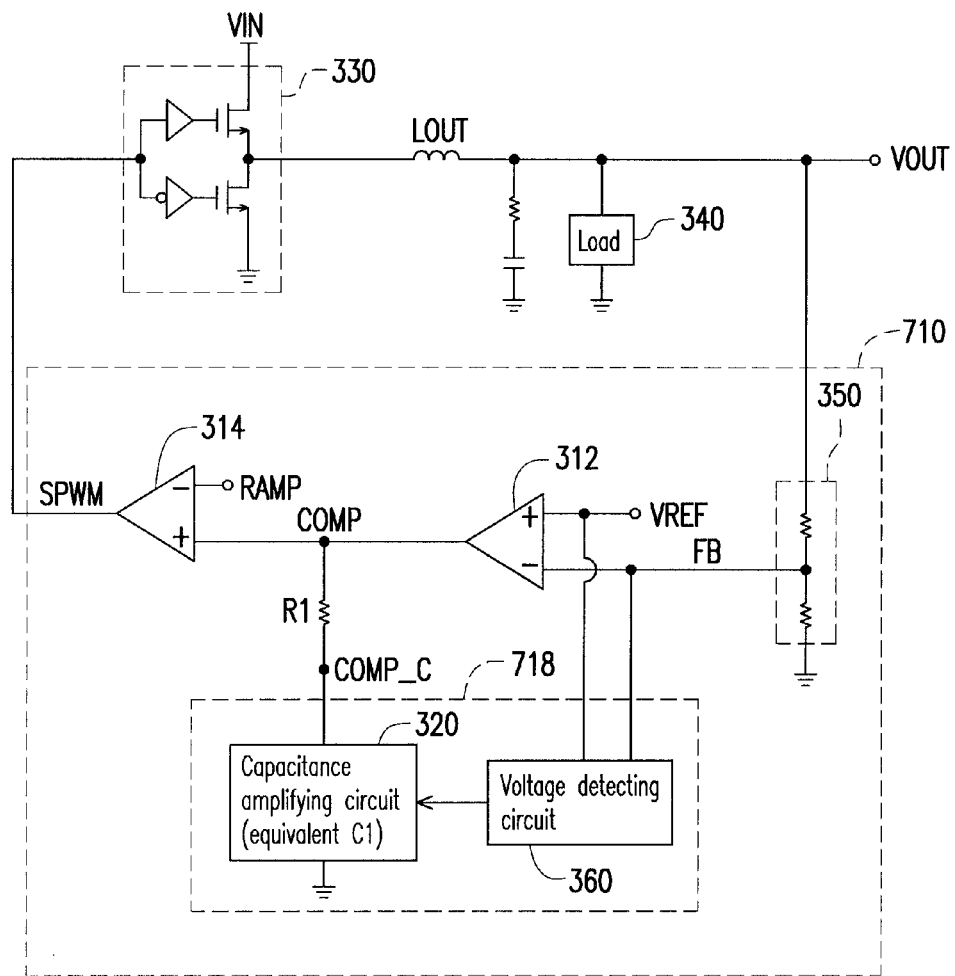
FIG. 6 is a schematic diagram of a DC-DC converter according to another embodiment of the invention.

FIG. 6 is a schematic diagram of a DC-DC converter 700 according to another embodiment of the invention. Referring to FIG. 6, a DC-DC controller 710 is similar to the DC-DC controller 310. An adjustable capacitor circuit 718 includes the capacitance amplifying circuit 320 and a voltage detecting circuit 360.

The voltage detecting circuit 360 is connected to the non-inverting input terminal and the inverting input terminal of the error amplifier 312 and the capacitance amplifying circuit 320. The voltage detecting circuit 360 dynamically controls the capacitance amplifying circuit 320 according to a change of the load 340. When the load 340 changes, the output voltage VOUT accordingly changes, and the feedback voltage FB is also changed. Therefore, the voltage detecting circuit 360 can dynamically control the capacitance amplifying circuit 320 according to the change of the feedback voltage FB.

Figure 7:
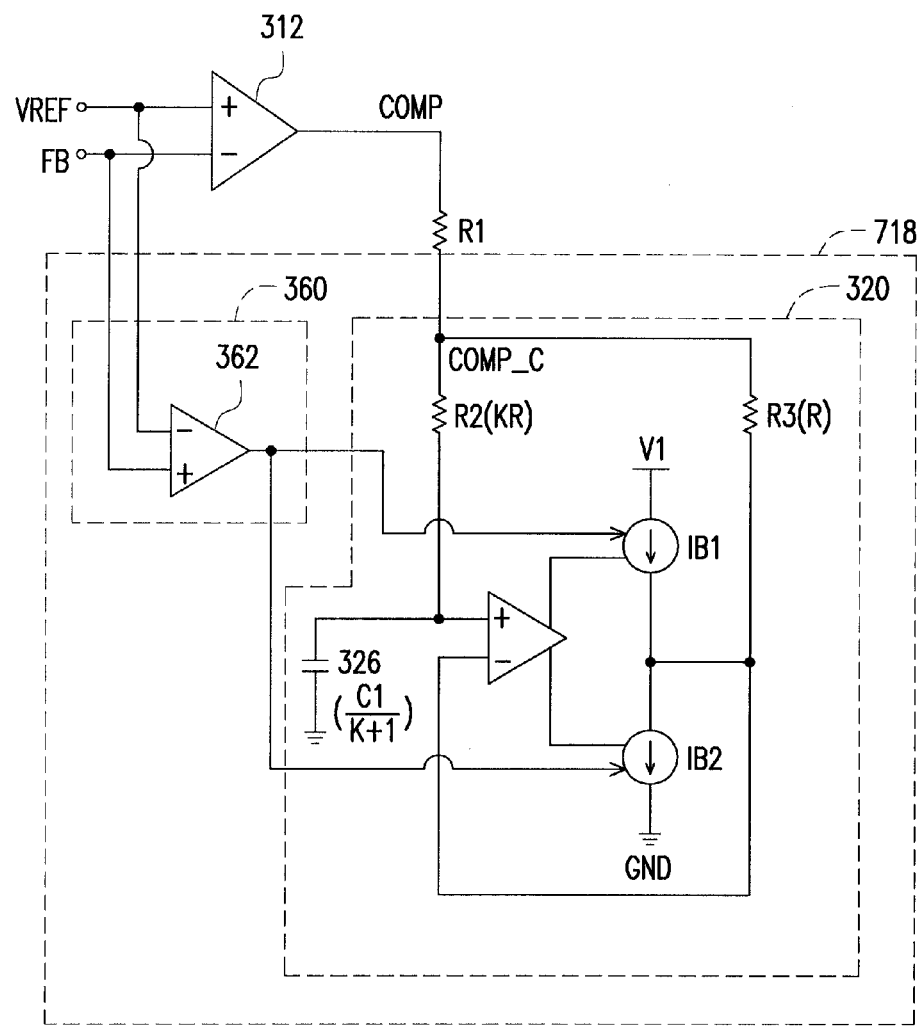
FIG. 7 is a detailed circuit diagram of an adjustable capacitor circuit of FIG. 6.

FIG. 7 is a detailed circuit diagram of the adjustable capacitor circuit 718 of FIG. 6. The adjustable capacitor circuit 718 includes the capacitor amplifying circuit 320 and the voltage detecting circuit 360. The voltage detecting circuit 360 includes an amplifier 362, where an inverting input terminal of the amplifier 362 is connected to the non-inverting input terminal of the error amplifier 312, a non-inverting input terminal of the amplifier 362 is connected to the inverting input terminal of the error amplifier 312, and an output terminal of the amplifier 362 is connected to the capacitance amplifying circuit 320.

Moreover, the output terminal of the amplifier 362 is connected to the control terminal of the controllable current source IB1 and the control terminal of the controllable current source IB2. When the voltage detecting circuit 360 detects that the feedback voltage FB changes along with the change of the load 340, the voltage detecting circuit 360 downgrades the current of the controllable current sources IB1 and IB2, so that the equivalent capacitance value of the capacitor 326 is decreased.

Moreover, it is assumed that the resistance values of the resistors R2 and R3 are respectively K times R and 1 times R, and the equivalent capacitance value of the capacitor 326 is C1/(K+1), a total equivalent capacitance value of the terminal COMP_C of the capacitor amplifying circuit 320 is then equal to C1/(K+1) times (K+1), namely, the total equivalent capacitance value is equal to C1.

Figure 8:
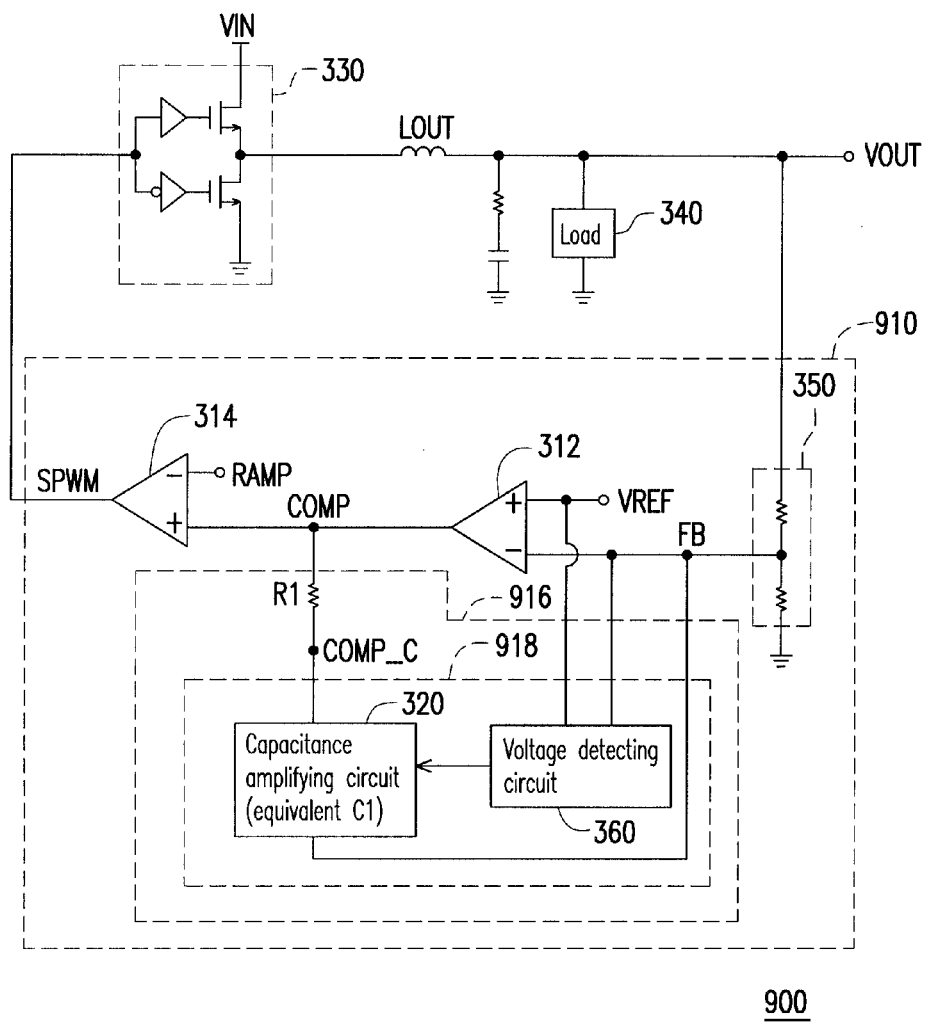
FIG. 8 is a schematic diagram of a DC-DC converter according to still another embodiment of the invention.

FIG. 8 is a schematic diagram of a DC-DC converter 900 according to still another embodiment of the invention. Referring to FIG. 8, a DC-DC controller 910 is similar to the DC-DC controller 710, and a difference there between is that one terminal of a compensation circuit 916 is coupled between the output terminal of the error amplifier 312 and the PWM generation circuit 314, and another terminal of the compensation circuit 916 is connected to the inverting input terminal of the error amplifier 312. In other words, in FIG. 6, one terminal of the capacitance amplifying circuit 320 is connected to the resistor R1, and another terminal thereof is connected to the ground terminal GND; while in FIG. 8, one terminal of the capacitance amplifying circuit 320 is connected to the resistor R1, and another terminal thereof is connected to the inverting input terminal of the error amplifier 312.

A working principle of an adjustable capacitor circuit 918 of FIG. 8 is similar to that of the adjustable capacitor circuit 718 of FIG. 7, so that details thereof can refer to the embodiment of FIG. 7, which are not repeated.

Figure 9:
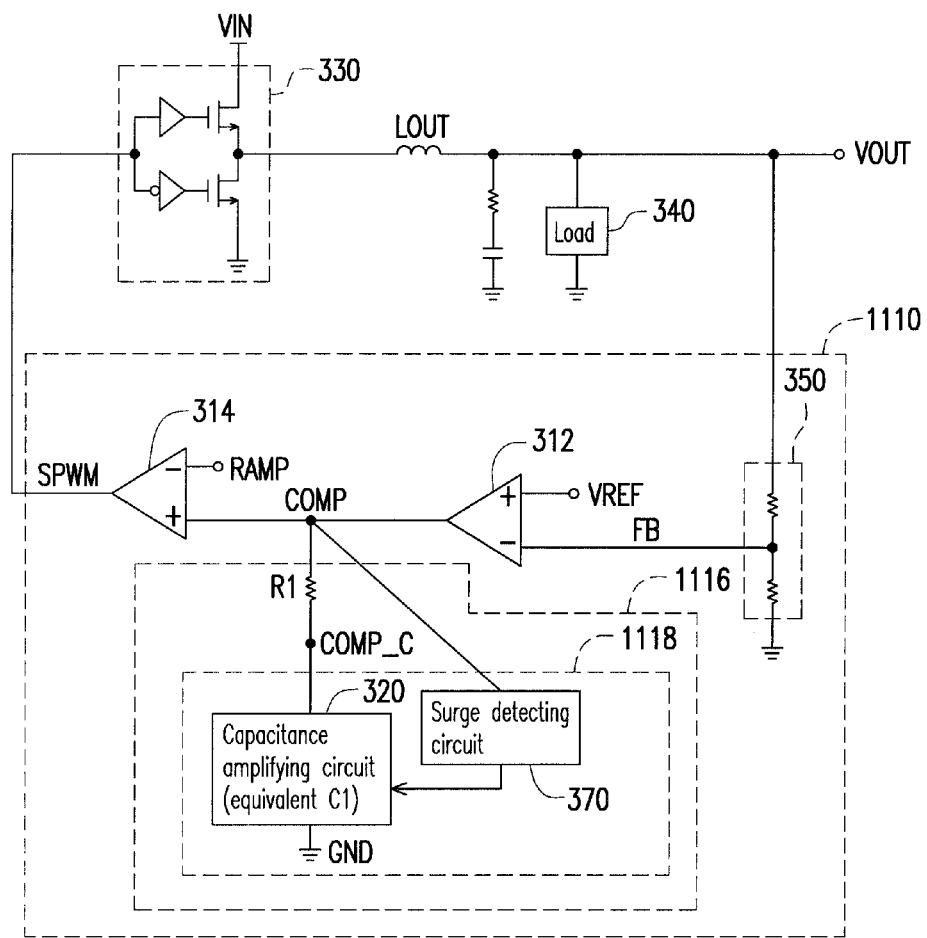
FIG. 9 and FIG. 10 are schematic diagrams respectively illustrating a DC-DC converter according to yet another embodiment of the invention.
Figure 10:
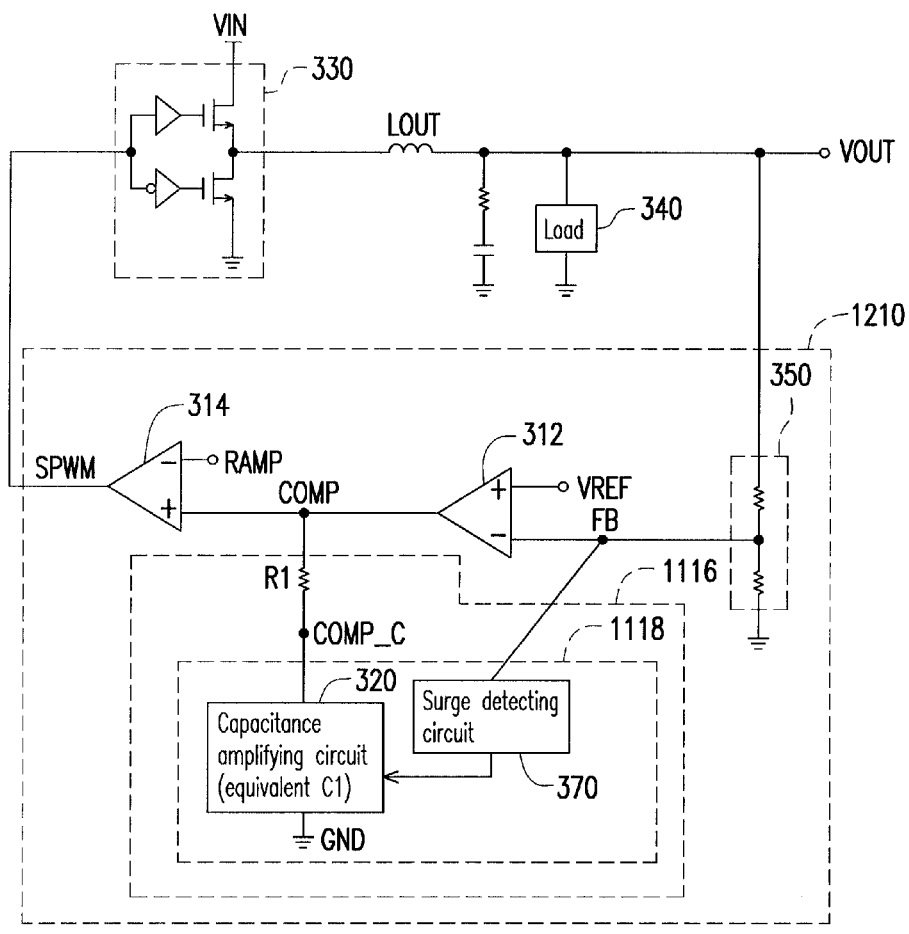

FIG. 9 and FIG. 10 are schematic diagrams respectively illustrating a DC-DC converter 1100/1200 according to yet another embodiment of the invention. Referring to FIG. 9 and FIG. 10, a DC-DC controller 1110/1210 is similar to the DC-DC controller 310. An adjustable capacitor circuit 1118 includes the capacitance amplifying circuit 320 and a surge detecting circuit 370. The surge detecting circuit 370 is connected to the non-inverting input terminal or the output terminal of the error amplifier 312, and the surge detecting circuit 370 dynamically controls the capacitance amplifying circuit 320 according to a change of the error signal COMP or a change of the feedback voltage FB.

Figure 11:
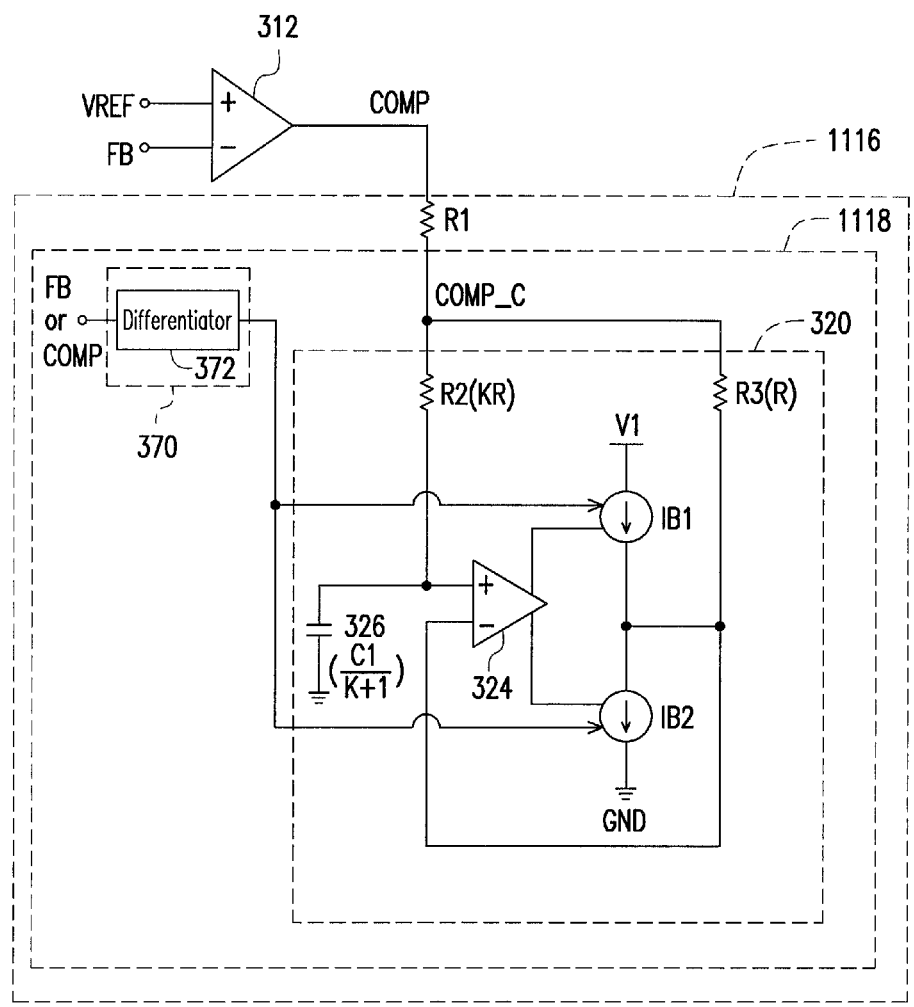
FIG. 11 is a detailed circuit diagram of an adjustable capacitor circuit of FIG. 9 and FIG. 10.

FIG. 11 is a detailed circuit diagram of the adjustable capacitor circuit 1118 of FIG. 9 and FIG. 10. The adjustable capacitor circuit 1118 includes a capacitor amplifying circuit 320 and a surge detecting circuit 370. The surge detecting circuit 370 can be implemented by a differentiator. The surge detecting circuit 370 performs a surge detection on the error signal COMP or the feedback voltage FB. When a voltage difference variation exceeds a predetermined value, the surge detecting circuit 370 activates a control mechanism to control the capacitance amplifying circuit 320. For example, when the surge detecting circuit 370 detects a load change, it downgrades the current of the controllable current sources IB1 and IB2. In this way, the equivalent capacitance value of the capacitor 326 is decreased, which may speed up the output variation of the error amplifier 312, so as to improve the transient response.

Figure 12A:
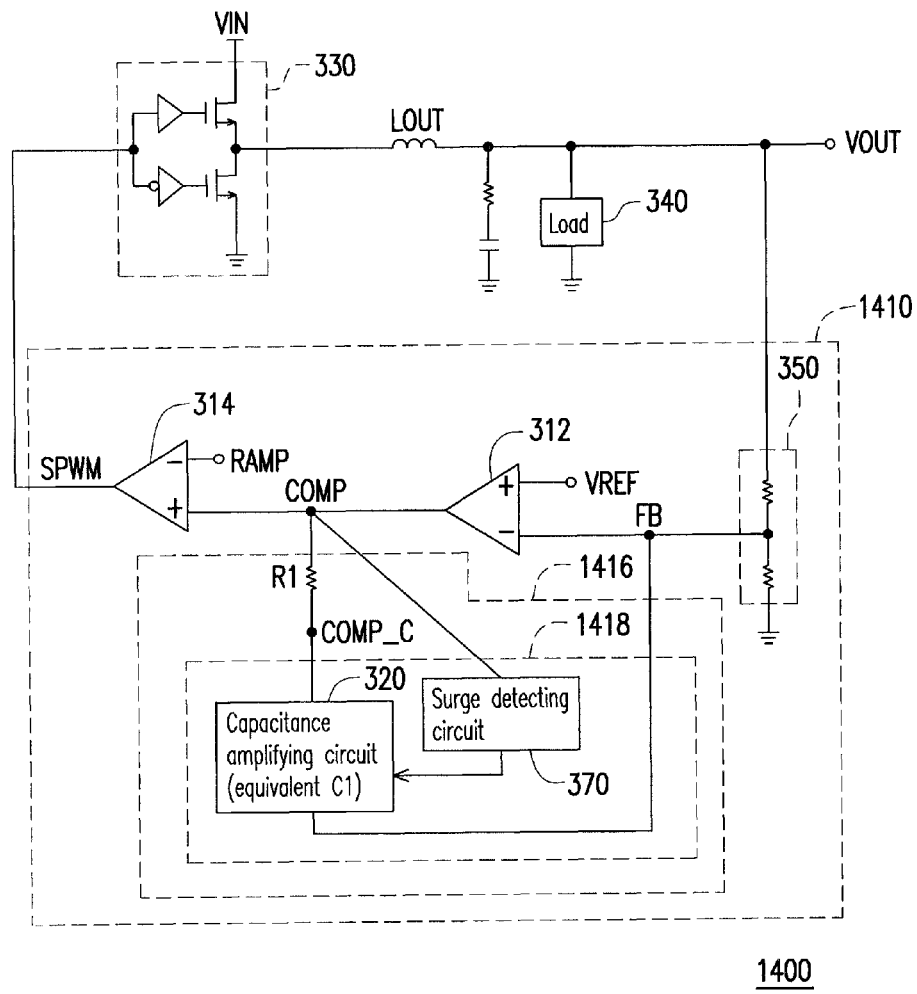
FIG. 12A and FIG. 12B are schematic diagrams respectively illustrating a DC-DC converter according to yet another embodiment of the invention.
Figure 12B:
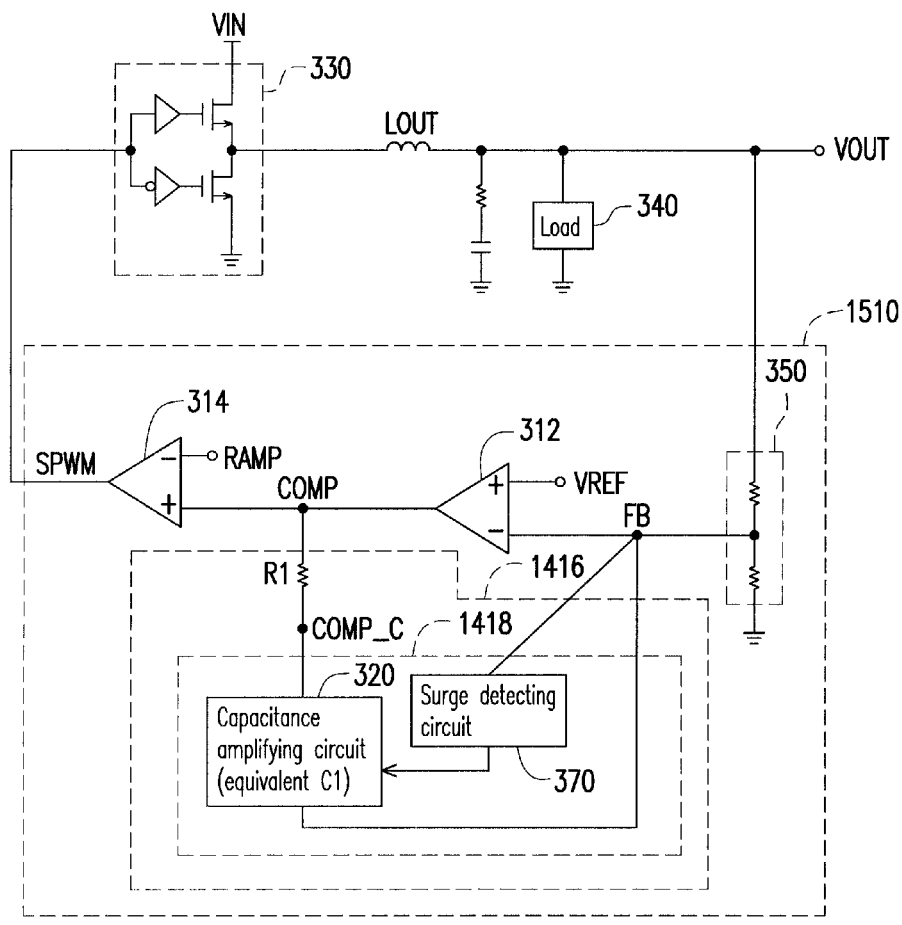

FIG. 12A and FIG. 12B are schematic diagrams respectively illustrating a DC-DC converter 1400/1500 according to yet another embodiment of the invention. Referring to FIG. 12A and FIG. 12B, a DC-DC controller 1410/1510 is similar to the DC-DC controller 1110/1210, and a difference there between is that one terminal of a compensation circuit 1416 is coupled between the output terminal of the error amplifier 312 and the PWM generation circuit 314, and another terminal of the compensation circuit 1416 is connected to the inverting input terminal of the error amplifier 312. In other words, in FIG. 9/FIG. 10, one terminal of the capacitance amplifying circuit 320 is connected to the resistor R1, and another terminal thereof is connected to the ground terminal GND; while in FIG. 12A/FIG. 12B, one terminal of the capacitance amplifying circuit 320 is connected to the resistor R1, and another terminal thereof is connected to the inverting input terminal of the error amplifier 312.

In summary, the DC-DC controller detects a current change of the output terminal of the error amplifier according to a detection mechanism, or detects a change of the feedback voltage input to the error amplifier, or detects a voltage change of the input terminal or the output terminal of the error amplifier, the equivalent capacitance value of the adjustable capacitor circuit can be dynamically adjusted according to the change of the load, so as to speed up a reaction rate in the transient response.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A direct current (DC)-DC controller, connected to an output stage and a load, wherein the output stage is connected to the load through an output inductor, the DC-DC controller comprising:
   an error amplifier, having a first input terminal connected to one terminal of the output inductor, and a second input terminal receives a reference voltage;
   a pulse width modulation (PWM) generation circuit, connected to the error amplifier, and providing a PWM signal to the output stage; and
   a compensation circuit, connected to an output terminal of the error amplifier, and comprising an adjustable capacitor circuit, wherein the adjustable capacitor circuit dynamically adjusts an equivalent capacitance value according to a change of the load,
   wherein the adjustable capacitor circuit comprises:
      a current detecting circuit, connected to the output terminal of the error amplifier and the capacitance amplifying circuit, and dynamically controlling the capacitance amplifying circuit according to the change of the load; and
      a capacitance amplifying circuit configured to provide the equivalent capacitance value, and wherein the capacitance amplifying circuit comprises:
         a capacitor;
         a first amplifier, connected to the capacitor;
         a first controllable current source, connected to the first amplifier;
         a second controllable current source, connected to the first controllable current source and the first amplifier;
         a first resistor, connected to a first input terminal of the first amplifier;
         a second resistor, having a first terminal connected to the first resistor, and a second terminal connected to a second input terminal of the first amplifier; and
         a capacitor, coupled between the first input terminal of the first amplifier and a ground terminal;
      wherein a first terminal of the first controllable current source is connected to an operating voltage, a control terminal of the first controllable current source is connected to the current detecting circuit, a second terminal of the first controllable current source is connected to the second terminal of the second resistor and the second input terminal of the first amplifier, and a third terminal of the second controllable current source is connected to the first amplifier, and
      wherein a first terminal of the second controllable current source is connected to the second terminal of the first controllable current source, the second terminal of the second resistor and the second input terminal of the first amplifier, a control terminal of the second controllable current source is connected to the current detecting circuit, and a second terminal of the second controllable current source is connected to the ground terminal.

2. The DC-DC controller as claimed in claim 1, wherein the adjustable capacitor circuit downgrades the equivalent capacitance value in case of a transient change of the load.

3. A direct current (DC)-DC controller, connected to an output stage and a load, wherein the output stage is connected to the load through an output inductor, the DC-DC controller comprising:
   an error amplifier, having a first input terminal connected to one terminal of the output inductor, and a second input terminal receives a reference voltage;
   a pulse width modulation (PWM) generation circuit, connected to the error amplifier, and providing a PWM signal to the output stage; and
   a compensation circuit, connected to an output terminal of the error amplifier, and comprising an adjustable capacitor circuit, wherein the adjustable capacitor circuit dynamically adjusts an equivalent capacitance value according to a change of the load,
   wherein the adjustable capacitor circuit comprises:
      a voltage detecting circuit, connected to the first input terminal and the second input terminal of the error amplifier and the capacitance amplifying circuit, and dynamically controlling the capacitance amplifying circuit according to the change of the load; and
      a capacitance amplifying circuit configured to provide the equivalent capacitance value, and wherein the capacitance amplifying circuit comprises:
         a capacitor;
         a first amplifier, connected to the capacitor;
         a first controllable current source, connected to the first amplifier; and
         a second controllable current source, connected to the first controllable current source and the first amplifier.

4. The DC-DC controller as claimed in claim 3, wherein the voltage detecting circuit comprises a second amplifier, a first input terminal of the second amplifier is connected to the second input terminal of the error amplifier, a second input terminal of the second amplifier is connected to the first input terminal of the error amplifier, and an output terminal of the second amplifier is connected to the capacitance amplifying circuit.

5. The DC-DC controller as claimed in claim 3, wherein the capacitance amplifying circuit further comprises:
   a first resistor, connected to a first input terminal of the first amplifier; and
   a second resistor, having a first terminal connected to the first resistor, and a second terminal connected to a second input terminal of the first amplifier;
   wherein the capacitor is coupled between the first input terminal of the first amplifier and a ground terminal,
   wherein a first terminal of the first controllable current source is connected to an operating voltage, a control terminal of the first controllable current source is connected to the voltage detecting circuit, a second terminal of the first controllable current source is connected to the second terminal of the second resistor and the second input terminal of the first amplifier, and a third terminal of the first controllable current source is connected to the first amplifier, and wherein a first terminal of the second controllable current source is connected to the second terminal of the first controllable current source, the second terminal of the second resistor and the second input terminal of the first amplifier, a control terminal of the second controllable current source is connected to the voltage detecting circuit, and a second terminal of the second controllable current source is connected to the ground terminal.

6. A direct current (DC)-DC controller, connected to an output stage and a load, wherein the output stage is connected to the load through an output inductor, the DC-DC controller comprising:

an error amplifier, having a first input terminal connected to one terminal of the output inductor, and a second input terminal receives a reference voltage;

a pulse width modulation (PWM) generation circuit, connected to the error amplifier, and providing a PWM signal to the output stage; and a compensation circuit, connected to an output terminal of the error amplifier, and comprising an adjustable capacitor circuit, wherein the adjustable capacitor circuit dynamically adjusts an equivalent capacitance value according to a change of the load, wherein the adjustable capacitor circuit comprises:
a surge detecting circuit, connected to the second input terminal or the output terminal of the error amplifier, and dynamically controlling the capacitance amplifying circuit according to the change of the load; and
a capacitance amplifying circuit configured to provide the equivalent capacitance value, and wherein the capacitance amplifying circuit comprises:
a capacitor;
a first amplifier, connected to the capacitor;
a first controllable current source, connected to the first amplifier; and
a second controllable current source, connected to the first controllable current source and the first amplifier.

7. The DC-DC controller as claimed in claim 6, wherein the surge detecting circuit comprises a differentiator.

8. The DC-DC controller as claimed in claim 6, wherein the capacitance amplifying circuit further comprises:

a first resistor, connected to a first input terminal of the first amplifier; and a second resistor, having a first terminal connected to the first resistor, and a second terminal connected to a second input terminal of the first amplifier;

wherein the capacitor is coupled between the first input terminal of the first amplifier and a ground terminal, wherein a first terminal of the first controllable current source is connected to an operating voltage, a control terminal of the first controllable current source is connected to the surge detecting circuit, a second terminal of the first controllable current source is connected to the second terminal of the second resistor and the second input terminal of the first amplifier, and a third terminal of the first controllable current source is connected to the first amplifier, and wherein a first terminal of the second controllable current source is connected to the second terminal of the first controllable current source, the second terminal of the second resistor and the second input terminal of the first amplifier, a control terminal of the second controllable current source is connected to the surge detecting circuit, and a second terminal of the second controllable current source is connected to the ground terminal.

* * * * *